(12) United States Patent
Miura et al.

(10) Patent No.: US 6,732,843 B2
(45) Date of Patent: May 11, 2004

(54) ONE-WAY CLUTCH

(75) Inventors: Yoshihisa Miura, Nara (JP); Tomomasa Kubo, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/193,189

(22) Filed: Jul. 12, 2002

(65) Prior Publication Data

US 2003/0010592 A1 Jan. 16, 2003

(30) Foreign Application Priority Data

| Jul. 13, 2001 | (JP) | P2001-213629 |
| Jul. 13, 2001 | (JP) | P2001-213631 |
| Jul. 17, 2001 | (JP) | P2001-216956 |

(51) Int. Cl.$^7$ ............................................... F16D 41/07
(52) U.S. Cl. .................................... 192/45.1; 192/41 A
(58) Field of Search ............................ 192/45.1, 41 A; 188/82.8

(56) References Cited

U.S. PATENT DOCUMENTS

| 2,385,799 A | | 10/1945 | Dodge | |
| 2,744,598 A | * | 5/1956 | Troendly | 192/45.1 |
| 2,824,635 A | * | 2/1958 | Troendly et al. | 192/45.1 |
| 2,973,072 A | * | 2/1961 | Ferris | 192/45.1 |
| 3,219,163 A | * | 11/1965 | Zlotek | 192/45.1 |
| 4,766,987 A | | 8/1988 | Message | |
| 4,880,093 A | | 11/1989 | Message | |
| 5,002,167 A | | 3/1991 | Kinoshita et al. | |
| 5,052,533 A | | 10/1991 | Carey et al. | |
| 5,335,761 A | | 8/1994 | Leitz | |
| 5,469,949 A | | 11/1995 | Leitz | |
| 5,607,036 A | * | 3/1997 | Costin | 192/45.1 |
| 5,765,670 A | * | 6/1998 | Fujiwara et al. | 192/45.1 |
| 6,220,414 B1 | * | 4/2001 | Nagaya et al. | 192/45.1 |

FOREIGN PATENT DOCUMENTS

| JP | 5-503343 | 6/1993 |
| JP | 7-101057 | 11/1995 |
| JP | 2555332 | 9/1996 |
| JP | 2653040 | 5/1997 |
| JP | 2686269 | 8/1997 |

OTHER PUBLICATIONS

European Search Report dated Oct. 2, 2002.

* cited by examiner

Primary Examiner—Saul Rodriguez
(74) Attorney, Agent, or Firm—McGinn & Gibb, PLLC (57) ABSTRACT

A one-way clutch includes a retainer (1), a spring (2), and sprags (3) which are provided in pockets of the retainer and those of the spring in a pivotable manner and forced by tongue-like flaps formed in the spring in a direction in which the sprags (3) are to be locked. A peripheral maximum width (La) of an outer cam surface of the sprag (3) and a peripheral maximum width (Lb) of an inner cam surface are greater than a circumferential width (Lp) of the pocket of the retainer (1). Further, a width (Lc) of the sprag (3) in the direction of inclination is made smaller than a circumferential width (Lp) of the pocket of the retainer (1).

18 Claims, 8 Drawing Sheets

ONE-WAY CLUTCH

BACKGROUND OF THE INVENTION

The invention relates to a one-way clutch, and more particularly, to a one-way clutch which prevents sprags from sinking into pockets of a retainer and achieves a stable engagement characteristic, by means of a protuberance formed at an edge of each pocket of a retainer so as to protrude in a radially outward direction.

Figure 12:
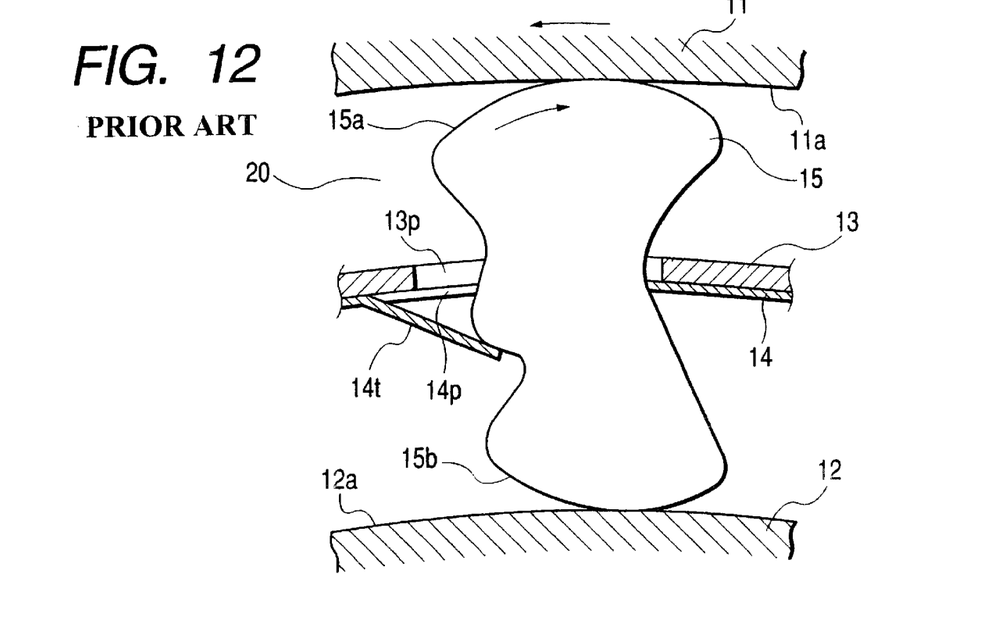
FIG. 12 is a fragmentary cross-sectional view of members constituting a related-art one-way clutch.

As shown in FIG. 12, a one-way clutch employed in an automatic power transmission system of an automobile usually comprises a retainer 13, a spring 14, and sprags 15. The one-way clutch is disposed in an annular space 20 defined between an outer ring 11 and an inner ring 12. By means of relative rotation arising between the outer ring 11 and the inner ring 12, the inner and outer rings are subjected to repeated rotation and locking. Specifically, when the sprags 15 are rotated in one direction, the sprags 15 act as wedges, whereby the outer ring 11 and the inner ring 12 rotate in an integrated fashion (locked state), thus transmitting power. When the sprags 15 are rotated in the opposite direction, the sprags 15 perform idle running, thus interrupting power transmission (i.e., an unlocked state). The one-way clutch which repeatedly performs transmission and interruption of power requires synchronism between sprags' operations and appropriate engagement at all times. For this reason, considerable thought has been put into measures for preventing another member from hindering operations of the sprags. Further, the one-way clutch of sprag type can achieve a stable engagement characteristic for the sprags even when variations attributed to misalignment have arisen between inner and outer bearing rings.

In such a one-way clutch of sprag type, the spring 14 is guided along the inner radius side of the retainer 13, thereby accurately positioning, in a radial direction, the sprags 15 held by the retainer 13 and the spring 14. Tongue-like flaps 14t of the spring 14 usually impart pre-stress (force) to the sprags 15 in a direction in which the sprags 15 are to be locked, thus contributing to an engagement characteristic. As mentioned, in relation to the one-way clutch, every time idle running and engagement of the sprags 15 are repeated, an outer peripheral cam surface 15a of each sprag 15 rotates over an inner peripheral surface (raceway surface) 11a of the outer ring 11, and an inner peripheral cam surface 15b rotates over an outer peripheral surface (raceway surface) 12a of the inner ring 12.

Figure 11:
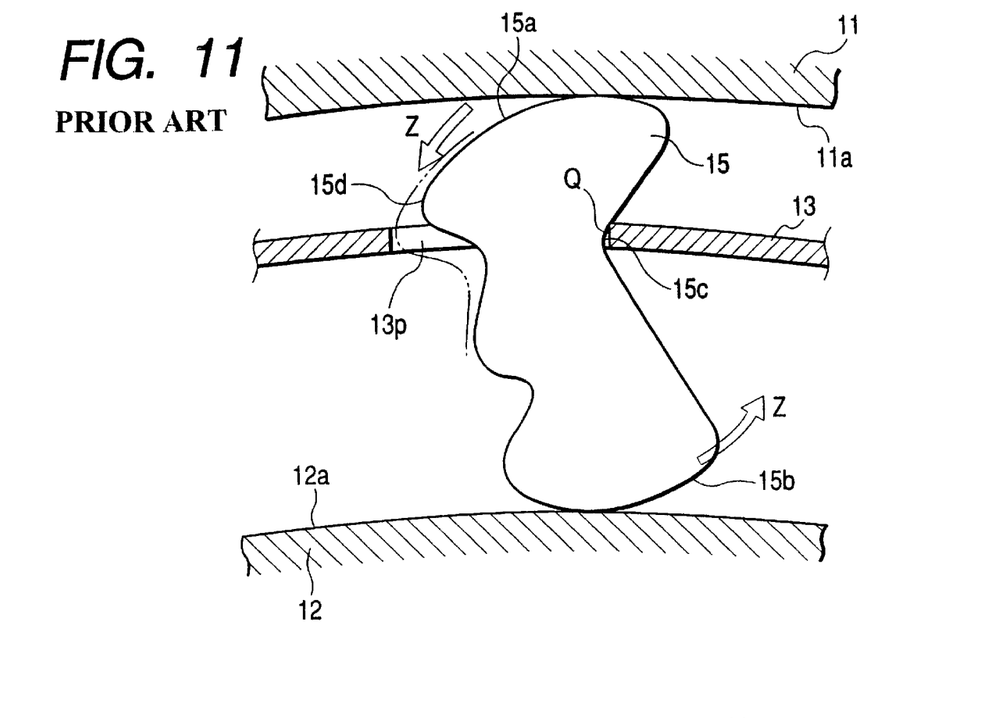
FIG. 11 is a fragmentary cross-sectional view of members constituting the related-art one-way clutch, showing a case where, as a result of torque having developed in a sprag, the sprag sinks into a pocket of a retainer.

In some cases, a one-way clutch of sprag type experiences slippage for reasons of misalignment, vibration, or decentering between the outer and inner rings during the course of pivotal movement in which sprags shift from a free rotation state to a locked state and vice versa, As shown FIG. 11, when slippage has arisen, torque is imparted to each sprag 15 while an edge Q of each pocket 13p of the retainer 13 is taken as a fulcrum. At this time, a recess 5c of the sprag 15 overlaps the edge Q of the pocket 13p of the retainer 13. The sprag 15 rotates in the direction of arrow Z while the point Q is taken as a fulcrum. If the pocket 13p of the retainer 13 is large, there arises a problem or a protuberance id formed at an upper edge of the sprag 15 sinking in toward the inner radius side of the pocket 13p. If such a sinking phenomenon arises, ensuring synchronism between sprags becomes difficult, thereby adversely affecting engagement performance of the clutch. However, each of the pockets 13p of the retainer 13 must have a predetermined minimum length for ensuring smooth action of the sprag 15.

The one-way clutch such as that shown in FIG. 12 is constituted of a retainer 23, a spring 14 guided by the retainer, and sprags 15 fitted into pockets 13p of the retainer 13 and pockets 14p of the spring 14. The one-way clutch is placed in an annular space defined between an unillustrated outer ring and an unillustrated inner ring. In such a one-way clutch, tongue-like flaps 14t of the spring 14 usually impart pre-stress (force) to the sprags 15 toward a direction in which the sprags 15 are to be locked, thus contributing to an engagement characteristic, and support the respective sprags 15 at all times. The one-way clutch is conveyed or transported while the retainer 13, the spring 14, and the sprags 15 are built together. The one-way clutch is incorporated into a space between an outer ring and an inner ring at a location where an automatic power transmission system is to be built.

As mentioned above, before being incorporated into a space between an outer ring and an inner ring, the one-way clutch is transported while a retainer, a spring, and sprags are built together. The sprags are merely held by tongue-like flaps formed in a spring guided along an inner radius side of the retainer. Retaining force (supporting force) of the tongue-like flaps of the spring substantially fails to act on the sprags before the clutch is incorporated into a space between an outer ring and an inner ring. In other words, the sprags are in a so-called free state. Accordingly, there has been a problem of sprags readily dropping from pockets of a spring (or pockets of a retainer) when subjected to slight external force during, e.g., transport.

Every time idle running and engagement of the sprags 15 are repeated, an outer peripheral cam surface 15a of each sprag 15 rotates over an inner peripheral surface (raceway surface) 11a of the outer ring 11, and an inner peripheral cam surface 15b rotates over an outer peripheral surface (raceway surface) 12a of the inner ring 12. Such a one-way clutch which repeatedly performs transmission and interruption of power requires synchronous actions and appropriate engagement of sprags at all times. Hence, considerable thought is put into preventing another member from hindering the actions of the sprags.

In some cases, a one-way clutch of sprag type experiences slippage for reasons of misalignment, vibration, or decentering between outer and inner rings during the course of a pivotal movement process in which sprags shift from a free rotation state to a locked state and vice versa. As shown FIG. 11, when slippage has arisen, torque is imparted to each sprag 15 while an edge Q of each pocket 3p of the retainer 13 is taken as a fulcrum. At this time, a recess 15c of the sprag 14 overlaps the edge Q of the pocket 13p of the retainer 13. The sprag 15 rotates in the direction of arrow Z while the point Q is taken as a fulcrum. If the pocket 13p of the retainer 13 is large, there arises a problem of a protuberance 15d formed at an upper edge of the sprag 15 sinking (falling) in toward the inner radius side of the pocket 13p, as designated by a chain double-dashed line. If such a sinking phenomenon arises, the sprag fails to return to its original engagement position, thus failing to ensure synchronism and adversely affecting engagement performance of the clutch. Alternatively, the retainer 3 may be damaged. However, each of the pockets 13p of the retainer 13 is required to have a predetermined length for ensuring smooth action of the sprag 15.

SUMMARY OF THE INVENTION

The invention has been conceived to solve the problem and object of the present invention is to provide one-way clutch which prevents dropping of sprags from pockets even when subjected to external force during transport and which involves a simple assembly operation.

Another object of the invention is to provide a one-way clutch which ensures a required length for pockets of a retainer and prevents an upper end of each sprag from sinking into a corresponding pocket even when the sprag has experienced slippage and torque.

Another object of the invention is to provide a one-way clutch in which an upper end of a sprag does not sink into a corresponding pocket of a retainer even when the sprag experiences slippage, to thereby generate torque.

In order to solve the aforesaid object, the invention is characterized by having the following arrangement.

(1) A one-way clutch comprising:
 a retainer in including a pocket;
 a spring which includes a pocket and a tongue-like flap and is guided by the retainer; and
 a sprag which is pivotally provided in the pockets of the retainer and the spring, and forced by the tongue-like flap in a direction in which the sprag is to be locked, respectively, wherein a maximum circumferential width of an outer cam surface of the sprag and a maximum circumferential width of an inner cam surface of the sprag are greater than a circumferential width of the pocket of the retainer, and the sprag has a width of the sprag in a direction of inclination which is made smaller than the circumferential width of the pocket of the retainer.

(2) The one-way clutch according to (1), wherein the width of sprag in the direction of inclination corresponds to a width across flat.

(3) A one-way clutch placed in an annular space between an outer ring and an inner ring comprising:
 a retainer including a pocket;
 a spring which includes a pocket and a tongue-like flap guided by the retainer; and
 a sprag which is fitted into pockets of the retainer of the spring and are forced, by tongue-like flaps formed in the spring, toward a direction in which the sprag is to be locked; and
 a protuberance radially outwardly protruding from an edge on a part of the pocket of the retainer facing a direction in which the sprag is to be unlocked.

(4) The one-way clutch according to (3), wherein a plurality of the protuberances protrudes from the edge of the pocket.

(5) The one-way clutch according to (3), wherein the sprag comes into contact with the protuberance to prevent the sprag from sinking into an inner radius side of the pockets.

(6) The one-way clutch according to (3), wherein the protuberance comes into contact with the sprag when the sprag released from a locked state and freely rotates.

(7) A one-way clutch placed in an annular space between an outer ring and an inner ring comprising:
 a retainer including a pocket;
 a spring which includes a pocket and a tongue-like flap guided by the retainer; and
 a sprag which is fitted into pockets of the retainer of the spring and are forced, by tongue-like flaps formed in the spring, toward a direction in which the sprag is to be locked;
 a recess, for a pivotal movement of the sprag when the sprag pivots in an unlock direction in which the sprag is to be released from a locked state, formed in the sprag; and a projection formed at a part of an outer cam surface of the sprag which faces the unlock direction,
 wherein a position on the recess at which the recess comes into contact with an edge of the pocket of the retainer is taken as a fulcrum, and a distance between the fulcrum and a surface of the projection is set to become longer than a circumferential length of the pocket of the retainer.

(8) The one-way clutch according to (7), wherein the projection comes into contact with the pocket of the retainer to prevent the sprag from sinking into an inner radius side of the pockets.

DETAILED DESCRIPTION OF PREFERRED EMBODIMENTS

A specific embodiment of the invention will be described hereinbelow by reference to the drawings.

FIRST EMBODIMENTS

Figure 1:
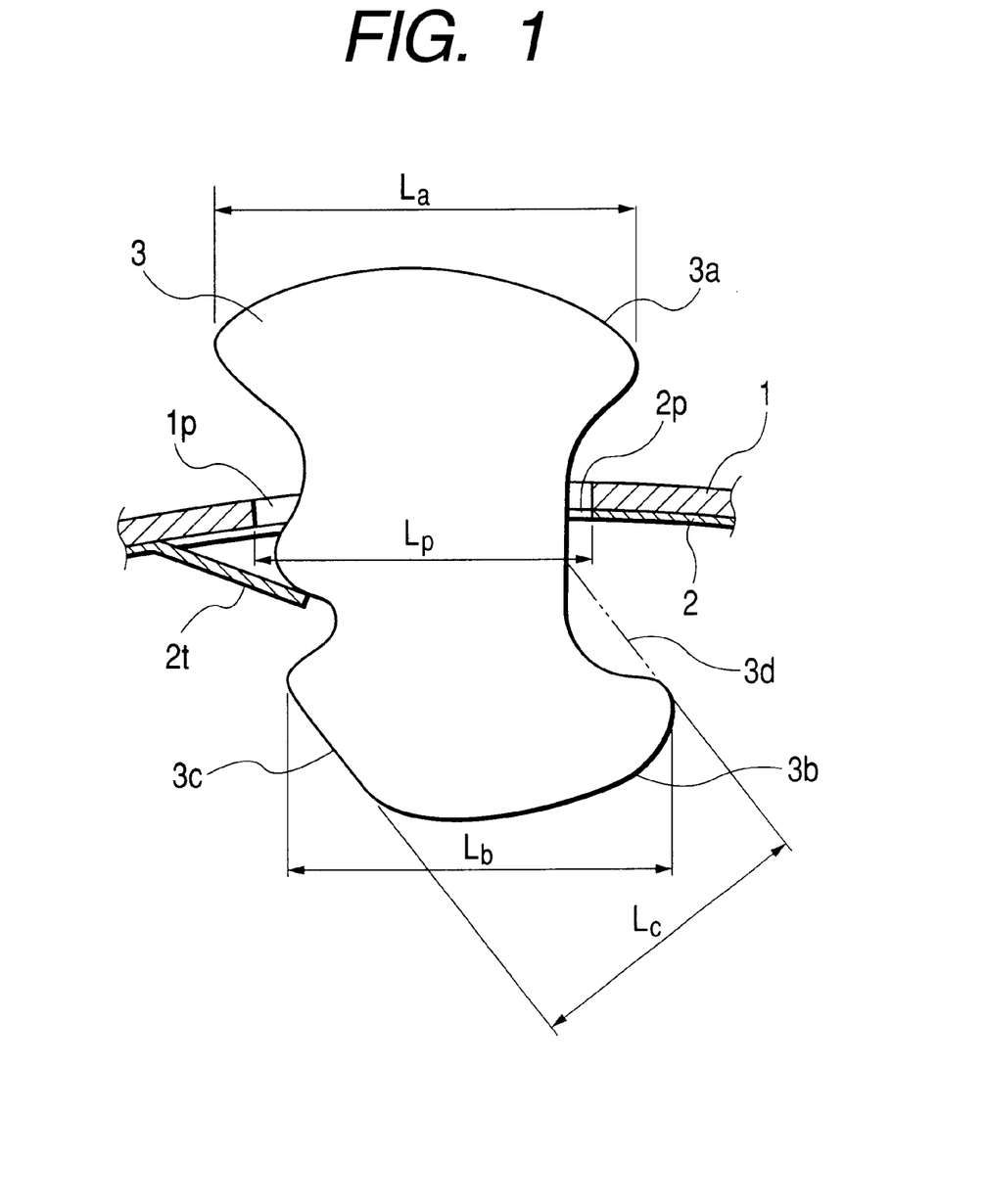
FIG. 1 is a fragmentary cross-sectional view of members constituting a one-way clutch according to the invention.

FIG. 1 is a fragmentary cross-sectional view of members constituting a one-way clutch according to the invention.

A one-way clutch comprises a retainer 1, a spring 2 guided by the retainer 1, and sprags 3 provided in pockets of the retainer 1 and pockets of the spring 2. Each of the sprags 3 has an outer cam surface 3a to be brought into contact with an inner peripheral surface of an outer ring (not shown) and an inner cam surface 3b to be brought into an outer peripheral surface of an inner ring (not shown). In this case, the maximum circumferential width of the outer cam surface of the sprag 3 is La. Further, the maximum circumferential width of the inner cam surface is Lb. Each of the sprags 3 has a constant width Lc in the direction of inclination.

The sprags 3 are inclined toward a direction in which the clutch performs idle running, The sprag 3 may have a width-across flat (i.e., two surfaces if a slope 3c of the sprag 3 and a slope 3d indicated by a chain double-dashed line are parallel to each other), as indicated by a chain double-dashed line. In other words, the width Lc of the sprag 3 in the direction of inclination also corresponds to a width defined by the two surfaces. The reason why the part of the sprag 3 facing the direction of inclination is taken as an idle-running side is that the part is susceptible to force exerted by a tongue-like flap 2t of the spring 2. In the embodiment, a width-across flat is provided on an inner radius side of the sprag 3. As a matter of course, a width-across flat may be provided on an outer radius side of the sprag 3.

Next, the width of the retainer 1 in a circumferential direction of each pocket 1p of is set to Lp. Pockets 2p into which corresponding sprags 3 are to be fitted are formed through the spring 2. The circumferential width of the pocket 2p is equal to that of the pocket; 1p of the retainer 1. A tongue-like flap 2t is formed in the spring 2. When the one-way clutch is placed in an annular space defined between an outer ring and an inner ring, the tongue-like flaps 2t force the sprags 3 in a direction in which the sprags 3 are to be locked. As mentioned above, only in a state in which the sprags 3 are fitted into the pockets of the retainer 1 and those of the spring 2, no substantial force is exerted on the sprags 3.

In the one-way clutch shown in FIG. 1, the following relationship exists between the maximum circumferential width La of the outer cam surface 3a of the sprag 3 and the circumferential width Lp of the pocket 1p of the retain 1.

La>Lp

The following relationship exists between the maximum circumferential width Lb of the inner cam surface of the sprag 3 and the circumferential width Lp of the pocket 1p of the retainer 1.

Lb>Lp

The following relationship exists between the circumferential width Lp of the pocket 1p of the retainer 1 and a constant width Lc of the sprag 3 in the direction of inclination.

Lp>Lc

Specifically, this one-way clutch has the following relationships: namely, the maximum circumferential width La of the outer cam surface 3a and the maximum circumferential width Lb of the inner cam surface 3b are greater than the circumferential width Lp of the pocket 1p of the retainer 1; and the width Lc of the sprag 1 in the direction of inclination is smaller than the circumferential width Lp of the pocket 1p of the retainer 1. In other words, the sprag 3 is given a portion which enables the sprag 3 to pass through the pocket 1p of the retainer 1 in the direction of inclination.

Figure 2A:
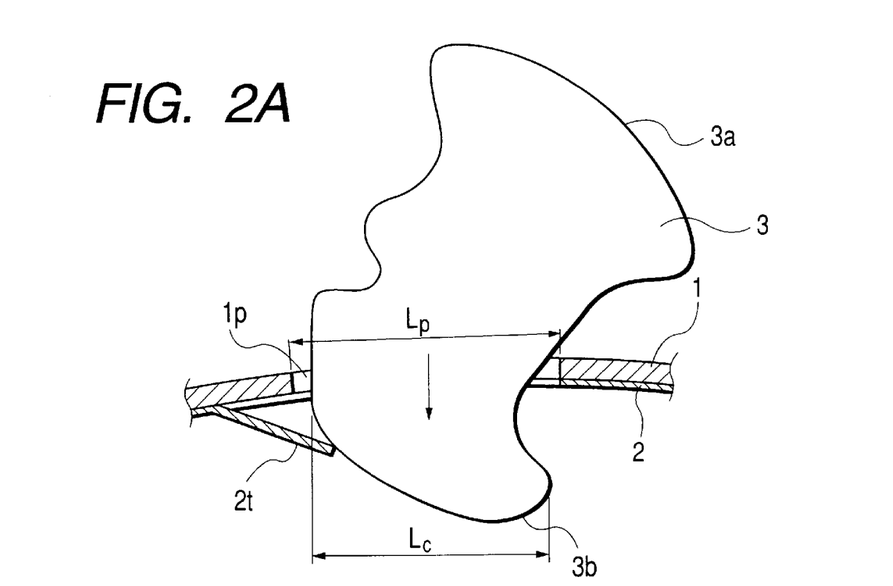
FIG. 2A is a view showing a state in which a sprag is being fitted into a pocket of a retainer.
Figure 2B:
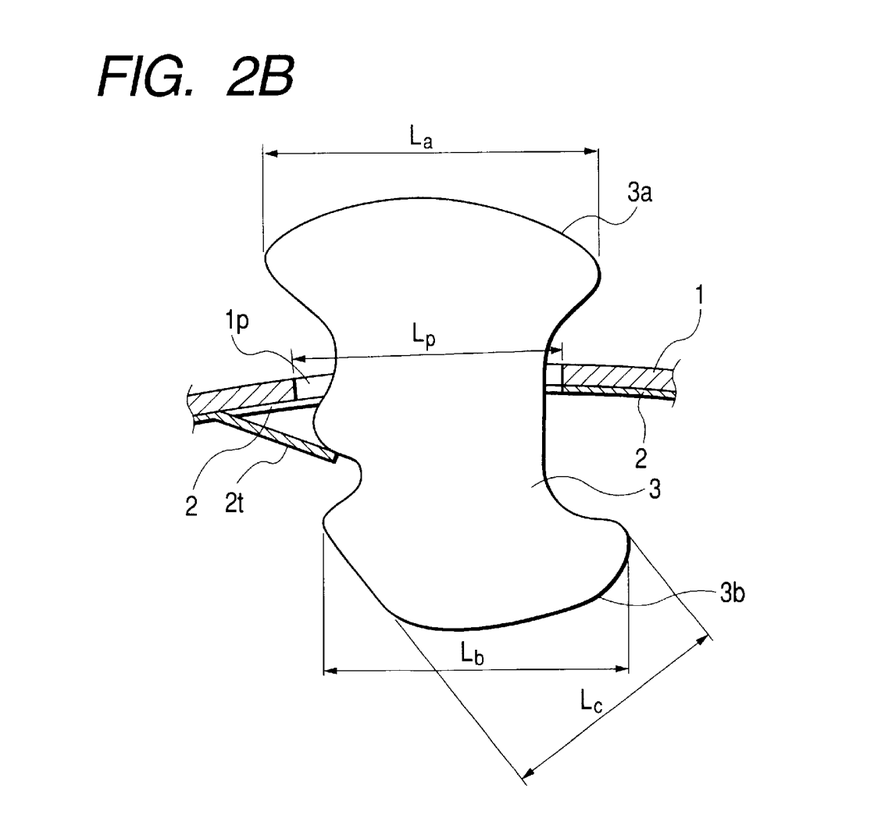
FIG. 2B is a view showing a state in which the sprag is fitted into the pocket of the retainer.

Next, there will be described a method of assembling the one-way clutch of the invention having the foregoing constituent elements. As shown in FIG. 2A, the retainer 1 and the spring 2 are assembled such that the pockets match each other and such that the spring 2 is guided along an inner radius side of the retainer 1. The sprags 3 are inclined and fitted into the pockets 1p of the retainer 1 (and corresponding pockets of the spring 2) such that the portion of each sprag 3 having a width Lc in the direction of inclination is fitted into corresponding pockets. In this case, the width Lc of the sprag 3 in the direction of inclination is smaller than the width Lp of the pocket 1p of the retainer 1, and hence the sprag 3 can be smoothly fitted into the pocket 1p. FIG. 2B shows that the sprag 3 is in the pocket 1p of the retainer 1. In this way, when the sprag 3 has entered the pocket 1p of the retainer 1, the sprag 3 remains held in that position, because the circumferential width La of the outer cam surface 3a of the sprag 3 is greater than the circumferential width Lp of the pocket 1p of the retainer 1. Particularly, since the tongue-like flap 2t of the spring 2 also forcefully supports a portion of the sprag 3, the sprag 3 does not fall from the pocket 1p of the retainer 1. A further explanation of why the sprag 3 does not fall from the pocket 1p of the retainer 1 is as follows.

Figure 3:
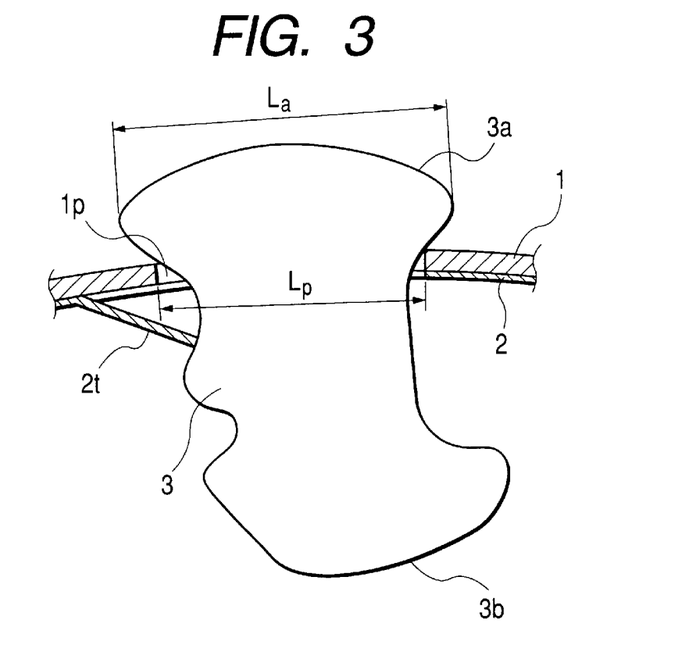
FIG. 3 is a view showing a case where an upper sprag is about to fall from the pocket of the retainer in an inner radial direction of the retainer.

FIG. 3 is a view showing a case where the sprag 3 is about to fall from the pocket 1p of the retainer 1 in the one-way clutch of the foregoing construction. More specifically, the sprag 3 fitted into the pocket 1p of the retainer 1 is supported by the tongue-like flap 2t of the spring 2. Even if the tongue-like flap 2t of the spring 2 fails to support the sprag 3 and, as a result, the sprag 3 is about to fall, a lower portion of the part of circumferential maximum width of the outer cam surface 3a of the sprag 3 is retained by the pocket 1p of the retainer 1. Hence, the sprag 3 does not fall.

Figure 4:
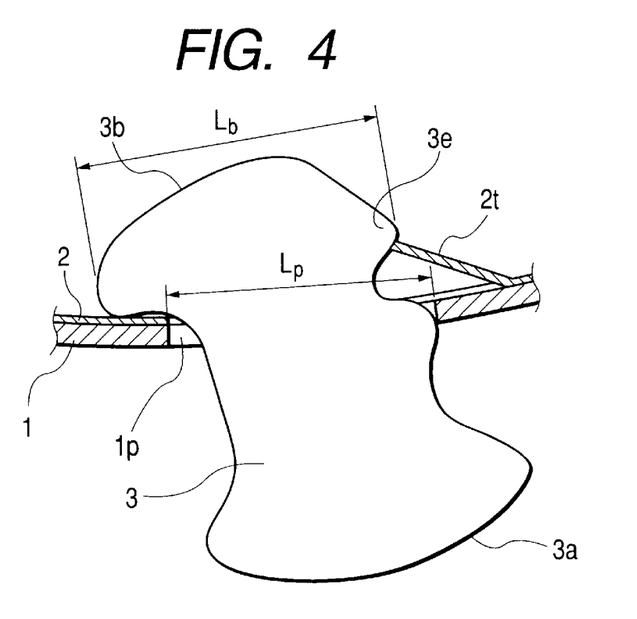
FIG. 4 is a view showing a case where a lower sprag is about to fall from the pocket of the retainer in an outer radial direction of the retainer.

FIG. 4 shows a relationship between the retainer 1 located in a lower position, the spring 2, and the sprag 3 when the one-way clutch is assembled. As illustrated, even if the sprag 3 fitted into the pocket 1p of the retainer 1 is about to fall., the sprag 3 will not fall, because the portion of the inner cam surface 3b of the sprag having the maximum circumferential width is larger than the pocket 1p of the retainer 1 and the sprag 3 is retained by the edge of the pocket 1p and by the tongue-like flap 2t of the spring 2. In this case, a portion 3e of the sprag 3 acts so as to press the tongue-like flap 2t, and hence the sprag 3 does not fall. Even if the sprag 3 is not supported by the tongue-like flap 2t of the spring 2, the sprag 3 will not fall, because the width Lb is greater than the width Lp.

As has been described in detail, the maximum circumferential width of an outer cam surface of the sprag and the maximum circumferential width of an inner cam surface are greater than the circumferential width of a pocket of the retainer. Hence, even if external force acts on sprags during transport, the sprags can be prevented from falling from a pocket of the retainer. The sprags are smaller in width than the pocket of the retainer with respect to the direction of inclination. Hence, assembly of the sprags is easy. Moreover, the spring exerts pre-stress on sprags in the direction of engagement at all times, and hence the part of a sprag which has a small width and faces a direction of inclination or the part of a sprag which faces a direction in which the sprag is given a width across flat is taken as an idle-running side. Drop of a sprag becomes less likely.

SECOND EMBODIMENT

Figure 5:
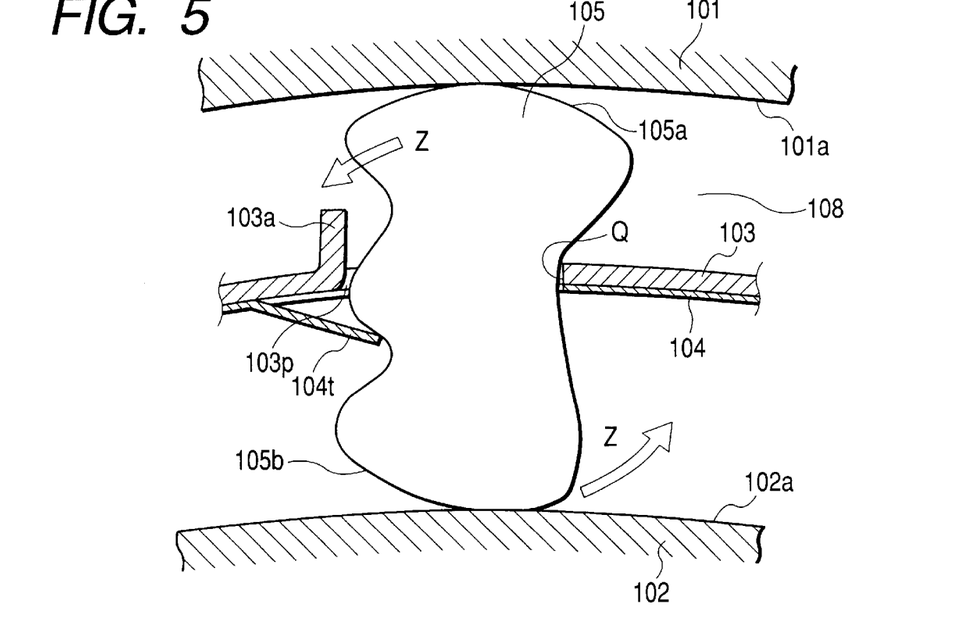
FIG. 5 is a fragmentary cross-sectional view of members constituting a one-way clutch according to the invention.

FIG. 5 is a fragmentary cross-sectional view of members constituting a one-way clutch according to a second embodiment of the invention. The one-way clutch comprises a retainer 103, a spring 104 guided by the retainer 103, and sprags 105 to be interposed between the retainer 103 and the spring 104. The one-way clutch is to be disposed in an annular space 108 defined between an outer ring 1 and an inner ring 102. Although not illustrated, in some cases the retainer 103 is constituted as an external retainer, and an internal retainer which rotates relative to the retainer 103 and is disposed on the internal radius side of the spring 104. The invention can also be applied to such internal and external retainers. In the following descriptions, a pivotal direction in which the sprags 105 are to be pivoted and locked between inner and outer rings by means of wedging action is taken as a lock direction, and a pivotal direction opposed to that direction is taken as an unlock direction.

Figure 6:
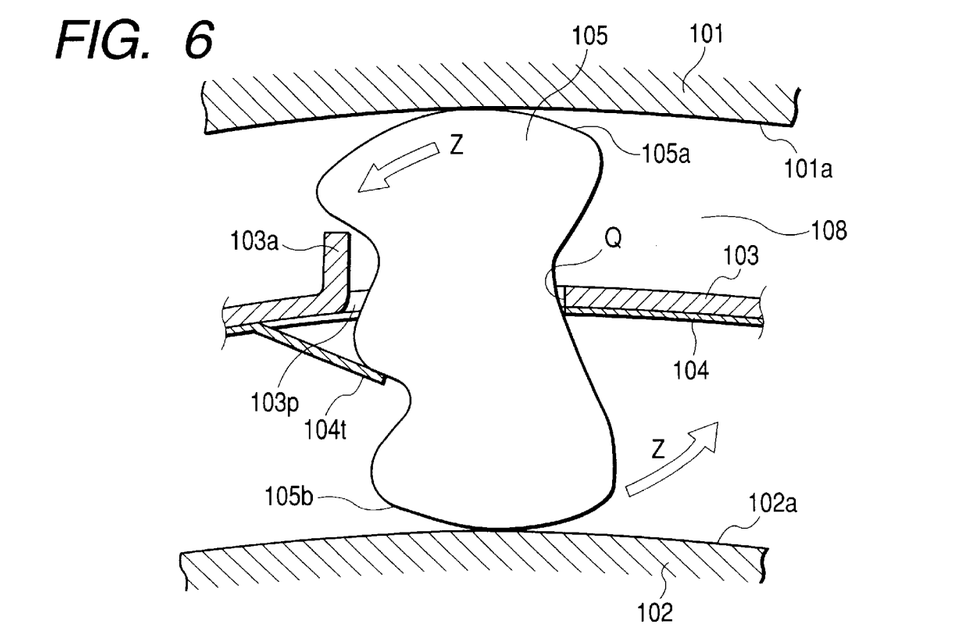
FIG. 6 is a fragmentary cross-sectional view of the members constituting the one-way clutch of the invention, showing a case where torque has developed in a sprag and the sprag has come into contact with a pocket of the retainer.

A tab 103a which is to serve as a protuberance (hereinafter called a "tab 103a" or "protuberance 103a") is provided at an end of each pocket 103p of the retainer 103 so as to project in a radially outward direction. The tabs 103a can be usually formed simultaneously with the pockets 103p of the retainer 103 through pressing during the course of the pockets 103p being pressed. As shown in FIG. 6, in case that a tab 103a is formed at an end of each pocket 103p of the retainer 103, when the sprags 105 has experienced slippage and torque during the course of the one-way clutch shifting from a locked state to an unlocked state, the sprags 105 come into contact with the tabs 103a of the pockets 103p of the retainer 103 before sinking into the pockets 103p.

Generally, the sprag 105 pivots, and the outer cam surface 105a rotates over the inner peripheral surface 101a of the outer ring 101. The inner cam surface 105b rotates over the outer peripheral surface 102a of the ring 102, thereby releasing the sprag 105 from a locked state (the same also applies to a case where the sprag 105 is brought from the state of free rotation to the locked state). If the sprag 105 slips during the course of pivotal movement for reasons of misalignment of the one-way clutch, vibration, or decentering arising between the outer ring 1 and the inner ring 102, the sprag 105 is imparted with torque while the edge section Q of the pocket 103p of the retainer 103 is taken as a fulcrum and is pivoted in the direction of arrow Z. In this case, since the tab 103a is formed at the edge on the unlock-side of each pocket 103p of the retainer 103 in a peripheral direction, the sprag 105 comes into contact with the upper end of the tab 103a and comes to a halt at that position. Accordingly, the sprags 105 are prevented from sinking into the inner radius side of the pocket 103p.

Figure 7A:
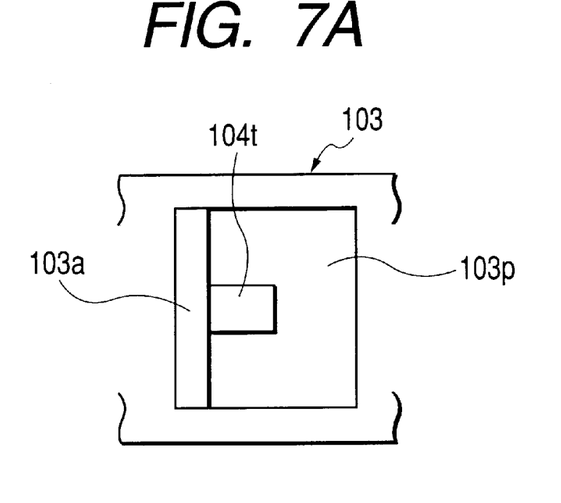
FIG. 7A is a plan view showing a pocket of a retainer and a spring, both belonging to the one-way clutch according to the invention.
Figure 7B:
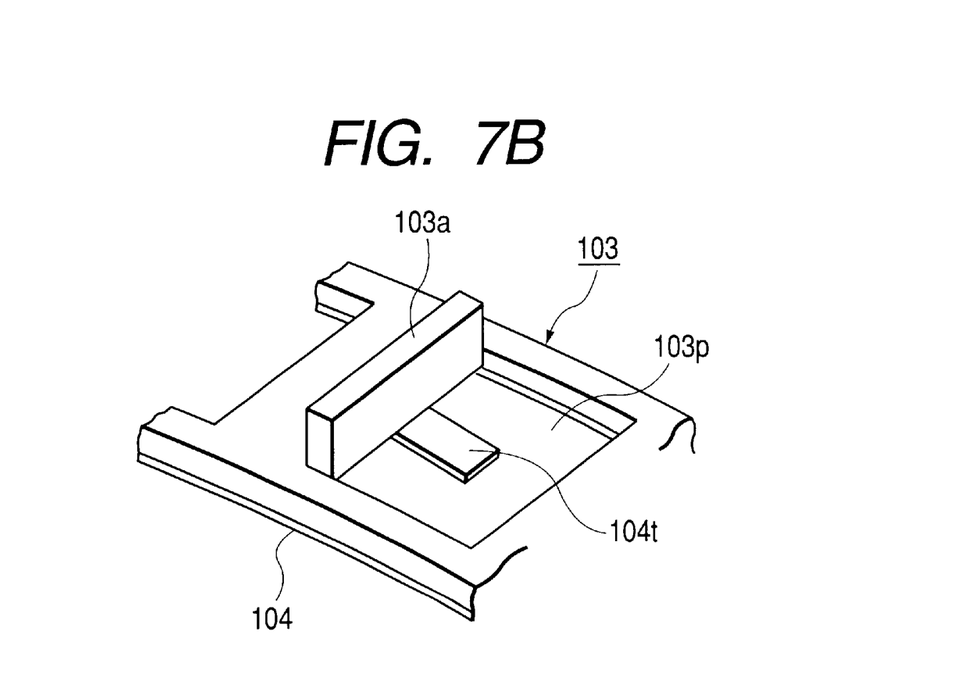
FIG. 7B is a perspective view of the pocket and the spring.
Figure 8A:
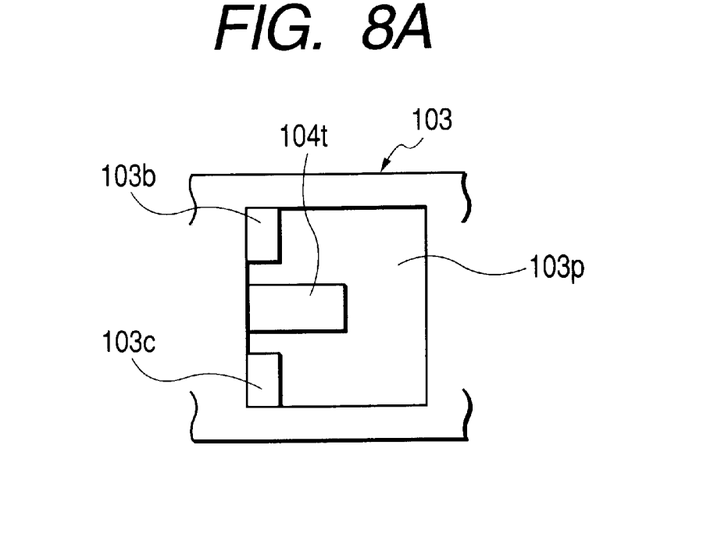
FIG. 8A is a plan view showing a pocket of a retainer and a spring, both belonging to a modification of the one-way clutch according to the invention.
Figure 8B:
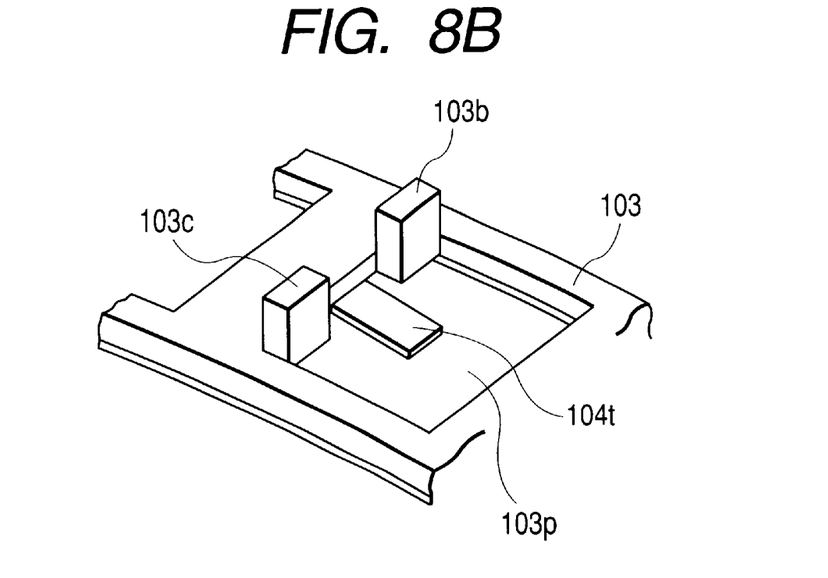
FIG. 8B is a perspective view of the pocket and the spring.

As shown in FIGS. 7A and 7E, the protuberance 103a provided at the edge on the unlock-side of the pocket 103p of the retainer 103 may be a single protuberance. However, as shown in FIGS. 8A and 8B, two (or a plurality of) protuberances 103b, 103c may be provided at the edge on the unlock-side of the pocket 103p with respect to the radial direction such that the pocket 103p has a convex-shaped aperture therein when viewed from the top (i.e., a center recess is interposed between steps when viewed from top). In this case, the tongue-like flap 104t of the spring 104 is to be situated in that center recess of the pocket 103p. The protuberances 103b, 103c which are to act as steps serve as a guide section for the spring 104.

In relation to the one-way clutch, the protuberances (or tabs) 103a or the protuberances (103b, 103c) provided in the retainer 103 must be formed so as to come into contact with the sprags 105 when the sprags 105 have released from a locked state and freely rotates. Specifically, if the sprag 105 comes into contact with the upper end of a corresponding tab 103a before being fully released from a locked state, the one-way clutch may experience engagement failures.

In the embodiment, the protuberances 103a (or protuberances 103b, 103c) provided at the respective edges of the pockets 103p of the retainer 103 are not limited to those provided in the illustrated embodiment. In other words, any protuberances may be employed, so long as the protuberances come into contact with the pockets 103p of the retainer 103 before the sprags 105 sink into the pockets 103p when torque has developed in the sprags 105 as a result of the one-way clutch having experienced slippage during the course of pivotal movement. The protuberances (tabs) 103a (or protuberances 103b, 103c) are one type of protuberances used for hindering sinking of The sprags 105. The protuberances can be embodied in various forms.

As has been described in detail, in relation to a one-way clutch according to the second embodiment of the invention, even when a sprag has experienced slippage during pivotal movement and torque has arisen with the edge of a corresponding pocket being taken as a fulcrum, an edge of a cam surface of the sprag comes into contact with a protuberance (tab) provided in the pocket of the retainer and extends substantially in a radial direction, thus coining to a halt at that position. In this way, the sprag can be prevented from sinking into the pocket of the retainer. Accordingly, there can be provided a one-way clutch which ensures synchronism between sprags and achieves a superior engagement characteristic.

THIRD EMBODIMENT

Figure 9:
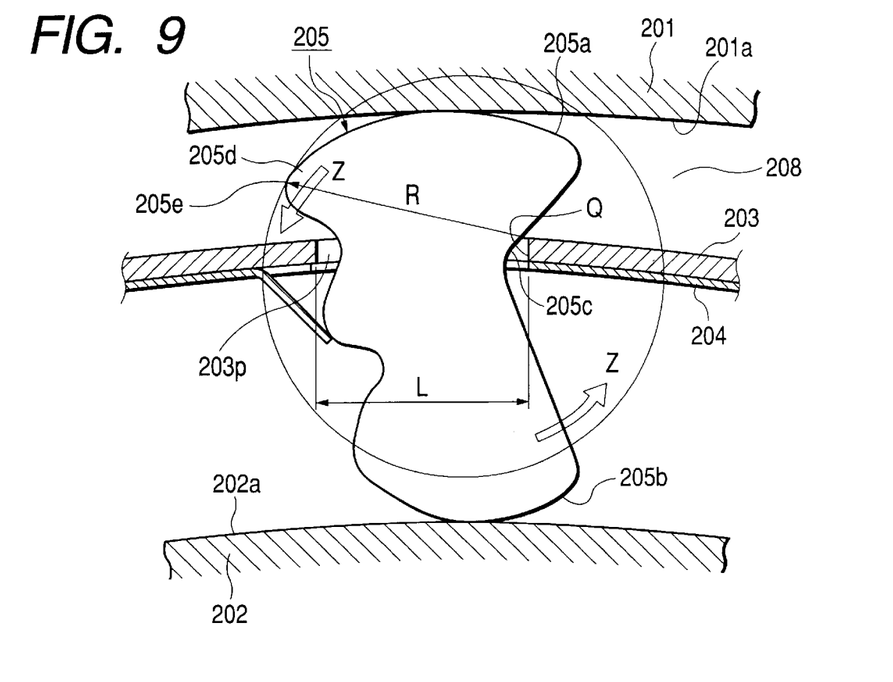
FIG. 9 is a fragmentary cross-sectional view of members constituting a one-way clutch according to the invention.

FIG. 9 is a fragmentary cross-sectional view of members constituting a one-way clutch according to a third embodiment of the invention. The one-way clutch comprises a retainer 203, a spring 204 guided by the retainer 203, and sprags 205 to be disposed in pockets of the retainer 203 and the spring 204. The one-way clutch is to be disposed in an annular space 208 defined between an outer ring 201 and an inner ring 202. Although not illustrated, in some cases the retainer 203 is constituted as an external retainer, an internal retainer which rotates relatively to the retainer 203 is disposed on the internal radius side of the spring 204. The invention can also be applied to such internal and external retainers. In the following descriptions, a pivotal direction in which the sprags 205 are to be pivoted and locked between inner and outer rings by means of wedging action is taken as a lock direction, and another pivotal direction opposite to that direction is taken as an unlock direction.

Formed on each of the sprags 205 are an outer cam surface 205a which is to rotate over an inner peripheral surface 201a of an outer ring 201, and an inner cam surface 205b which is to rotate over an outer peripheral surface 202a of the inner ring 202. A recess 205c for pivotal movement of the sprag 205 when the sprag pivots in the unlock direction is formed on the back of the sprag 205. Moreover, a projection 205d is formed on the edge of an outer cam surface on the part of the sprag 205 facing the unlock direction. As will be described later, the recess 205c formed on the back of the sprag 205 is located at a position where the recess 205c acts as a rotational fulcrum Q for torque (i.e., the edge of each pocket 203p of the retainer 203) when the sprag 205 has slipped. Here, a distance R between a position 205e on the projection 205d formed at the edge of the outer cam surface 205a and the fulcrum Q, the position 205e being the most distant from the fulcrum Q, is set so as to be longer than a circumferential length L of the pocket 203p of the retainer 203.

Figure 10:
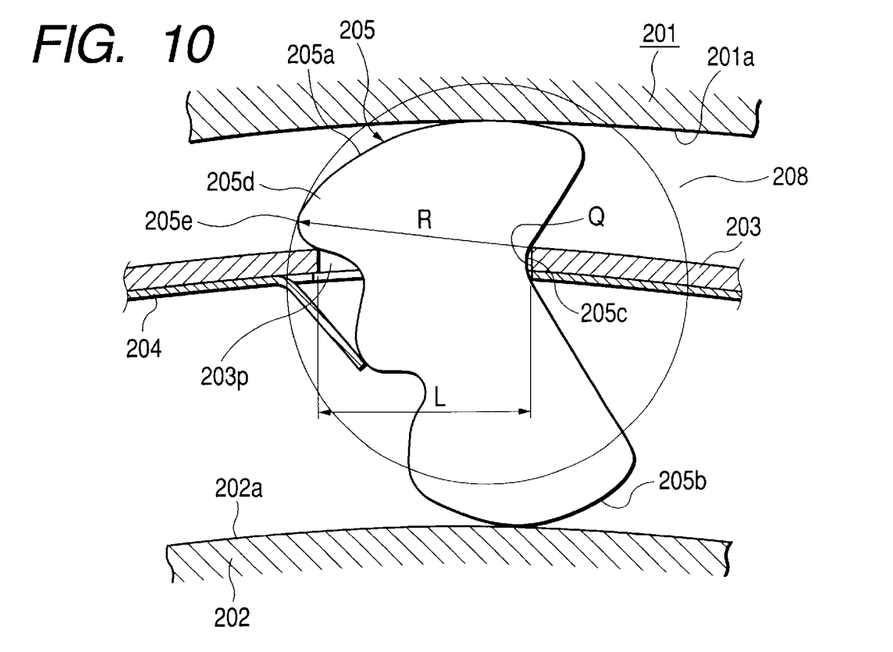
FIG. 10 is a fragmentary cross-sectional view of the members constituting the one-way clutch of the invention, showing a case where torque has developed in a sprag and the sprag has come to a halt at a position above a corresponding pocket of the retainer.

When the sprag 205 pivots, the outer cam surface 205a rotates over the inner peripheral surface 201a of the outer ring 201, and the inner cam surface 205b rotates over the outer peripheral surface 202a of the ring 202, thereby releasing the sprag 205 from a locked state (the same also applies to a case where the sprag 205 is brought from the state of free rotation to the locked state). If the sprag 205 has slipped during the course of pivotal movement for reasons of misalignment of the one-way clutch, vibration, or decentering arising between the outer ring 201 and the inner ring 202, the sprag 205 is imparted with torque while the edge section Q of the pocket 203p of the retainer 203 is taken as a fulcrum, and is pivoted in the direction of arrow Z. The distance R between the fulcrum point Q and the position 205e of the projection 205d formed at the edge of the outer cam surface 205a on the part of the sprag 205 facing the unlock direction is set so as to be longer than the circumferential length L of the pocket 203p of the retainer 203. As shown in FIG. 10, the neighborhood of the projection 205d comes to a halt at a position above the edge of the pocket 203p of the retainer 203, there by preventing sinking of a portion of the sprag 205 into the pocket 203p of the retainer 203.

In this one-way clutch, in a case where the projection 205d of the sprag 205 is to come to a halt at a position above the edge of the pocket 203p of the retainer 203, the projection 205d must be formed such that the projection comes into contact with the edge of the pocket when the sprag 205 has finished freely rotating and is sufficiently released from a locked state. In other words, if the sprag 205 has come to a halt at a position above the edge of the pocket 203p of the retainer 203 before being fully released from the locked state, the one-way clutch will experience an engagement failure.

As has been described in detail, even when a sprag has slipped during the course of pivotal movement and torque has arisen while the edge of a corresponding pocket is taken as a fulcrum, the edge of a cum surface of the sprag comes to a halt at a position above the pocket of the retainer, thereby preventing the sprag from sinking into the pocket of the retainer. Accordingly, there can be provided a one-way clutch which ensures synchronism between sprags and achieves a superior engagement characteristic.

What is claimed is:

1. A one-way clutch comprising:
    a retainer including a pocket;
    a spring which includes a pocket and a tongue-like flap and is guided by the retainer; and
    a sprag which is pivotally provided in the pockets of the retainer and the spring, and forced by the tongue-like flap in a direction in which the sprag is to be locked, respectively, wherein a maximum circumferential width of an outer cam surface of the sprag and a maximum circumferential width of an inner cam surface of the sprag are greater than a circumferential width of the pocket of the retainer, and the sprag has a width in a direction of inclination smaller than the circumferential width of the pocket of the retainer.

2. The one-way clutch of claim 1, wherein the width of the sprag in the direction of inclination corresponds to a width across a flat of the sprag.

3. A one-way clutch placed in an annular space between an outer ring and an inner rings comprising:
    a retainer including a pocket;
    a spring which includes a pocket and a tongue-like flap guided by the retainer; and
    a sprag which is fitted into the pockets of the retainer and the spring and is forced, by tongue-like flaps formed in the spring, toward a direction in which the sprag is to be locked; and
    a protuberance radially outwardly protruding from an edge on a part of the pocket of the retainer facing a direction in which the sprag is to be unlocked.

4. The one-way clutch according to claim 3, wherein a plurality of the protuberances protrudes from the edge of the pocket.

5. The one-way clutch according to claim 3, wherein the sprag comes into contact with the protuberance to prevent the sprag from sinking into an inner radius side of the pockets.

6. The one-way clutch according to claim 3, wherein the protuberance comes into contact with the sprag when the sprag is released from a locked state and freely rotates.

7. The one-way clutch of claim 1, wherein said retainer comprises a radially outwardly protruding tab.

8. The one-way clutch of claim 7, wherein said radially outwardly protruding tab is positioned on an edge of said pocket.

9. The one-way clutch of claim 1, wherein said radially outwardly protruding tab comprises a plurality of radially outwardly protruding tabs.

10. The one-way clutch of claim 1, wherein the sprag includes:
    a recess for a pivotal movement of the sprag when the sprag pivots in an unlock direction in which the sprag is to be released from a locked state; and
    a projection at a part of an outer cam surface of the sprag which faces the unlock direction, and
    wherein a position on the recess at which the recess may come into contact with an edge of the pocket of the retainer is a fulcrum, and a distance between the fulcrum and a surface of the projection is longer than a circumferential length of the pocket of the retainer.

11. A one-way clutch placed in an annular space between an outer ring and an inner rings comprising:
    a retainer including a pocket;
    a spring which includes a pocket and a tongue-like flap guided by the retainer; and
    a sprag which is fitted into the pocket of the retainer and the spring and is forced by the tongue-like flap in the spring, toward a direction in which the sprag will lock;
    wherein the sprag includes:
        a recess, for a pivotal movement of the sprag when the sprag pivots in an unlock direction in which the sprag is to be released from a locked state; and
        a projection at a part of an outer cam surface of the sprag which faces an unlock direction, and
    wherein a position on the recess at which the recess may come into contact with an edge of the pocket of the retainer functions as a fulcrum, and a distance between the fulcrum and a surface of the projection is longer than a circumferential length of the pocket of the retainer.

12. The one-way clutch according to claim 11, wherein the projection prevents the sprag from passing through the pocket sinking into an inner radius side of the retainer pockets.

13. The one-way clutch of claim 11, wherein said retainer comprises a radially outwardly protruding tab.

14. The one-way clutch of claim 13, wherein said radially outwardly protruding tab is positioned on an edge of said pocket.

15. The one-way clutch of claim 11, wherein said radially outwardly protruding tab comprises a plurality of radially outwardly protruding tabs.

16. The one-way clutch of claim 11, wherein the sprag has a width in a direction of inclination smaller than the circumferential width of the pocket of the retainer.

17. The one-way clutch of claim 16, wherein the width of the sprag in the direction of inclination corresponds to a width across a flat.

18. A one-way clutch placed in an annular space between an outer ring and an inner ring comprising:
    a retainer including a pocket;
    a spring which includes a pocket and a tongue-like flap guided by the retainer; and
    a sprag which is fitted into the pockets of the retainer and the spring and which is forced toward a direction in which the sprag is to be locked by the spring; and
    a protuberance radially outwardly protruding from an edge on a part of the pocket of the retainer facing a direction in which the sprag is to be unlocked.

* * * * *